July 6, 1926.
B. F. WINTERHOFF
GASOLINE INDICATOR
Filed July 9, 1923
1,591,462
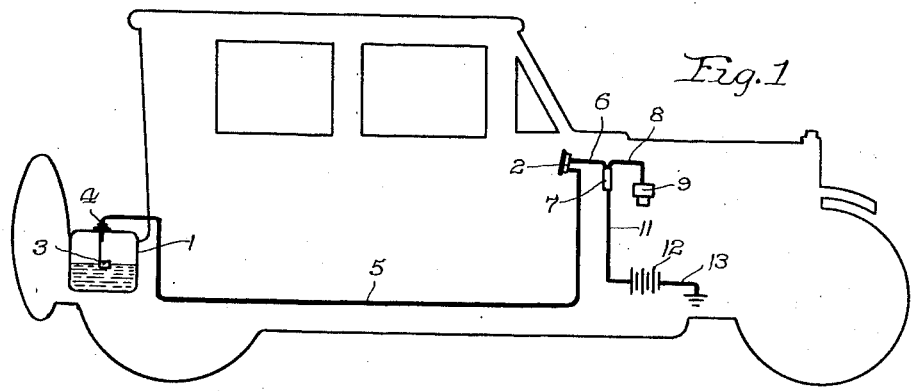
Fig. 1
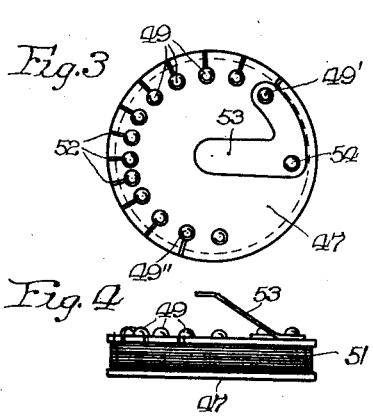
Fig. 3
Fig. 4
Fig. 5    Fig. 6
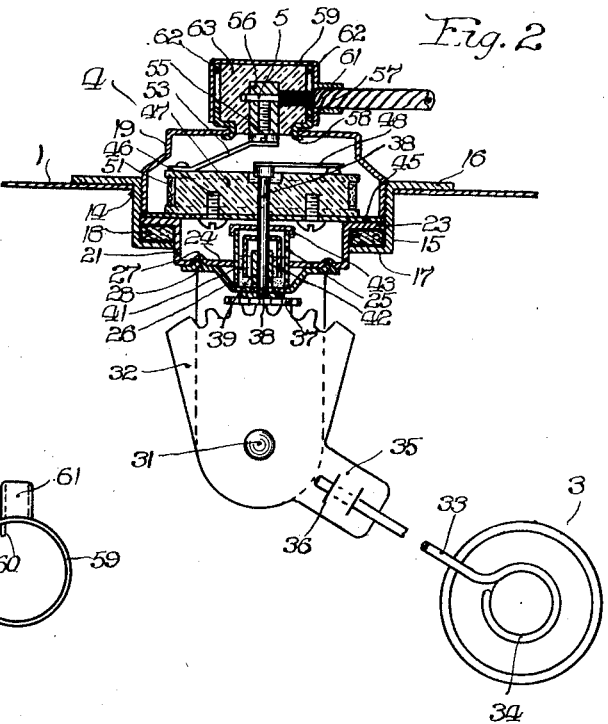
Fig. 2
Witnesses
Cameron A. Whitsett
Carl Megelin
Inventor
B. F. Winterhoff
By Brown Boettcher Dienner
Attorneys Patented July 6, 1926.

1,591,462

UNITED STATES PATENT OFFICE.

BENJAMIN F. WINTERHOFF, OF ELKHART, INDIANA, ASSIGNOR TO NATIONAL GAUGE AND EQUIPMENT COMPANY, OF LA CROSSE, WISCONSIN, A CORPORATION OF WISCONSIN.

GASOLINE INDICATOR.

Application filed July 9, 1923. Serial No. 650,325.

My invention relates to gasoline indicators, particularly to the type having application to motor driven vehicles for indicating on the dash board the quantity of gasoline in the supply tank.

The present gasoline indicator is electrical in operation, but certain features thereof, which are to be presently described, are applicable to other liquid fuel indicators having different principles of operation. Heretofore, electrically operating indicators have been objectionable, particularly to underwriters and automobile insurance companies because of the increased fire risk resulting from the possibility of the sparking and arcing of the electrical contacts igniting the gasoline, or vapor. It is one of the fundamental objects of my invention to obviate all fire hazard from this source by providing a new and improved seal between the interior of the supply tank and the electrical contact mechanism of the indicator. This seal is liquid in character, preferably employing mercury, and is totally impermeable to liquid gasoline or vapor. This liquid seal forms an impenetrable barrier on the moving part which connects the float within the supply tank with the contact mechanism outside of the tank. Cooperating with this liquid seal is a novel arrangement of cork gasket for sealing the immovable parts of the housing which encloses the electrical contact mechanism.

A further object of the invention is to provide an electrical indicator of this class, the circuit of which is connected to the ignition circuit of the internal combustion engine in such manner that the gasoline indicator will be thrown into and out of operation automatically by the closing and opening of the ignition circuit.

A further object of the invention is to provide a simplified and compact arrangement of electrical contact mechanism and its enclosing housing which is mounted on the gasoline tank, whereby the device will be inexpensive to construct and simple and easy to install on practically all types of cars.

Referring now to the accompanying drawings illustrating a preferred embodiment of my invention;

Figure 1 is a diagrammatic view showing the general location of the parts and the circuit connections of the present indicator with reference to a typical installation in an automobile.

Fig. 2 is a sectional view through the upper part of the gasoline tank, through the housing of the contact mechanism.

Fig. 3 is a plan view of the spool on which is wound the resistance coil, showing the arrangement of contact points or taps on its upper side.

Fig. 4 is a side elevational view of the same.

Fig. 5 is a fragmentary elevational view of the cup on the top of the electrical contact housing; and Fig. 6 is a bottom plan view of the cooperating cap.

Fig. 1 illustrates the indicator as applied to a car having its gasoline tank in the rear, but it will be obvious that the device has equal applicability to cars in which the gasoline tank is under the front seat, or under the cowl. The gasoline tank is indicated at 1, and the indicating gauge which is mounted on the dash is indicated at 2. A float 3 in the gasoline tank operates a suitable contact mechanism in a housing 4 mounted in the top of the gasoline tank, from which contact mechanism a wire 5 extends up to the gauge 2. The other end of the resistance winding disposed within the housing 4 is grounded, as will presently appear. From the other terminal of the gauge 2 a wire 6 leads to the ignition switch 7, or to any other suitable point for making connection with the ignition circuit. This ignition circuit is brefly represented by the wire 8 leading from the switch 7 to the timer mechanism in the timing and distributing head 9. A wire 11 leads down from the other side of the ignition switch 7 to the battery, conventionally represented at 12, and from the other side of this battery a wire 13 leads to a ground, consisting of the frame of the car. When the ignition switch 7 is closed to energize the ignition circuit for starting the car a current flow is set up through the gauge 2 and wire 5 to the contact mechanism in the housing 4. When the ignition circuit is broken, for interrupting the operation of the motor, the circuit of the gasoline indicator is likewise broken, so that there is a minimum likelihood of the gasoline indicator ever remaining in circuit accidentally and thereby exhausting the battery.

Referring now to Fig. 2, the electrical contact housing 4 is preferably set down in the top of the fuel tank 1 so as to minimize the projection of the housing above the top of the tank and avoid any interference with tire carriers, trunk rack, etc. An opening 14 is cut in the top of the tank 1, and set into this opening is a cup shaped supporting ring 15. The upper end of this ring has an outwardly turned flange 16 which is soldered or otherwise secured to the top wall of the tank, and the lower part of the ring forms an inwardly turned flange 17 which provides a seat for the cork gasket 18. The annular portion of the ring 15 is internally threaded for the reception of a screw threaded cap 19, which forms the upper casing section for housing the contact mechanism. An inner cup shaped ring 21 sets down within the outer ring 15, this inner ring passing down through the central opening defined by the lower flange 17 of the outer ring, and having an outwardly extending flange 23 which is adapted to be forced down against the cork gasket 18. The lower wall 24 of the ring 21 has a central opening in which a sleeve or tube 25 is rigidly secured in any suitable manner, such as by soldering. The sleeve 25 extends above and below the lower wall 24, being hermetically sealed at its lower end, as by a solder joint, in the depressed portion of a disc 26. The bottom wall 24 of the inner ring 21 has a conical depression 27 punched in its under side, and the disc 26 has a cooperating conical depression 28 punched in its upper surface for matching with the depression 27 and holding the disc in proper alignment with the ring 21. The disc and ring are preferably soldered together around the edge of the ring 26.

A bearing bracket 29 depends from the device, being preferably formed as a downwardly bent portion extending from one side of the disc 26. A pivot pin 31 carried by this bracket 29 pivotally supports a sector gear 32, to which is connected the float 3. The float 3 is either of cork or sheet metal construction, being of proper size for insertion through the opening 14 in the tank. A rod 33 is suitably secured to one end or side of the float 3, as illustrated by the eye 34 engaging an end portion of the float, and this rod has mounting at its other end in a tongue 35 extending from the sector gear 32. The gear and tongue 35 may be an integral stamping, for simplicity of construction, and an expedient way of connecting the rod 33 to the tongue 35 is to punch two spaced portions of the tongue downwardly and an intermediate portion upwardly as indicated at 36, passing the rod 33 through the raised portion 36 and soldering it in place to the tongue.

The sector gear 32 meshes with a circular gear 37 which is fast on the lower end of a shaft 38 passing upwardly into the upper part of the housing defined by the cap 19. The lower end of the shaft 38 has bearing support in a snugly fitting sleeve 39 which is rigidly secured by a hermetic joint to the bottom of the depressed disc 26. This bearing sleeve 39 extends upwardly in the outer sleeve 25 sufficiently far to retain an ample quantity of sealing liquid between the two sleeves. Dipping into this sealing liquid 41, and annularly spaced from the sleeves 39 and 25, is an inverted cup 42 which is mounted fast on the shaft 38. The sealing liquid 41 is preferably mercury, and the cup 42 dips into this annular well of mercury sufficiently far so that it would require a vapor pressure much in excess of that ever obtaining in the gasoline tank 1 to force the inner leg of mercury down sufficiently far to allow vapor bubbles to pass up on the outside of the cup 42. After the sleeve 25 has been filled with mercury the top of the sleeve is covered by a cap 43, which is preferably hermetically sealed around its edges, so that any tendency to displace the mercury traps a gas or air pressure in the upper part of the sleeve 25. The mercury 41 has the two-fold advantage of having sufficient weight and inertia for retarding any escaping vapor, and of having high viscosity and cohesion so that there is minimum possibility of leakage of the mercury if the device should be inverted during shipment.

Resting on the upper flange 23 of the inner shell 21 is a disc 45, which is rigidly held in clamped position on the flange 23 by the lower edge of the cap 19 screwing down on the periphery of this disc and forcing the disc and the flange 23 downwardly against the cork gasket 18. A pair of screws 46 pass up through this disc and tap into a spool-like member 47 of hard rubber or any other preferred material. The shaft 38 passes up through the disc 45 and spool 47, and at its upper end carries a contact arm 48 which is adapted to have wiping contact over a series of contacts 49 circularly arranged on the upper side of the spool 47. Wound around in the grooved periphery of the spool 47 is a high resistance wire 51. It will be noted in Figure 3 that the upper flange of the spool is slotted in line with each contact point 49 whereby the wire may be drawn up through the slot 52 and looped once or twice around the shank of the contact point in establishing electrical connection with these points. The enamel or other insulation on the wire is of course removed from that portion which is wrapped around the shank of the contact point. This provides a very simple and inexpensive method of winding the spool 47 and making connection with the several contact points 49. One end of the wire is connected to an end contact 49′, a predetermined length of wire being thereafter wound on the spool between the connections with each succeeding contact point. The other end of the wire is connected to the other end contact point 49″.

A stationary spring contact finger 53 is secured to the spool 47 by the end contact 49′ and by an additional attaching rivet 54, the spring end of this member extending upwardly and towards the center of the spool 47. Here it makes resilient connection with a terminal in the form of the head of a screw 55 which screws up in a terminal block 56 and clamps the end of the wire 5 in a transverse opening in this terminal block. A sheet metal cup 57 is mounted on the cap 19 for holding the terminal block 56 and receiving the end of the wire 5. This cup 57 has a reduced neck 58 which is inserted through a central opening in the top of cap 19 and is crimped over on the under side of the cap to securely hold the cup 57 in place. A sheet metal cap 59 sets down over the top of the shell 57, this cap having a tubular nipple 61 for receiving the end of the sheath or insulating covering of the wire 5. The cup 57 is slotted vertically on opposite sides as indicated at 62, for receiving the wire 5 from either side when the cap 59 is slipped down over the cup 57. The terminal block 56 and wire 5 are set into a plug 63 of insulating material such as hard rubber, this plug being set in the cap 59. A short spur 60 formed of an extension of the nipple 61 projects inwardly in the cap 59. This spur is adapted to hook under a notched shoulder 65 at one side of each slot 62. By turning the spur under this notched shoulder and permitting the cap to snap upwardly the spur and notch are locked together to securely hold the cap 59 in place.

It will be apparent that when the float 3 is hanging down at a low level, or when it is raised to the upper part of the tank under a high level of fuel, a given variation in fuel level will result in a greater range of angular movement of the sector gear 32 than when the float 3 is straight out substantially in the horizontal plane of the pivot 31. This is obvious from the fact that as the float approaches the vertical axis passing through the pivot 31, a relatively small rise or fall of the fuel level will result in a relatively large angular movement of the float. In order that the indicating gauge 2 have equidistant scale divisions and give a uniform reading it is desirable to have this variable rate of angular movement of the float compensated for; and this I have done by proportioning the spacing between the contact points 49 in accordance with this varying angular movement. As shown in Fig. 3, the points are spaced relatively far apart at the ends of the series to correspond with the relatively greater angular movement of the float in its up and down positions. This compensation may also be effected by varying the number of turns of wire between successive contact points 49, but I consider the method shown to be the more practicable. The compensation may be designed for taking care of round, elliptical or other formations of the main supply tank. The wire 51 is of relatively high resistance so that only a very small amount of current is employed for giving the indication. The indicating gauge 2 is of any preferred voltmeter construction with its scale divisions marked off to indicate the number of gallons in the tank, or the quantity of gasoline expressed in fractions of a tank-full. The ground in the contact housing 4 is, of course, established through the wiping finger 48 and shaft 38 at the latter's points of contact with the disc 45, cap 43 and bearing sleeve 39. The one-wire circuit resulting from this grounding of the system, is advantageous in that it reduces the cost of manufacture, installation and repair.

In assembling the contact housing 4 in the gasoline tank the screwing down of the housing shell or cap 19 can be made to impose a considerable pressure upon the cork gasket 18 so that this gasket is expanded out into firm engagement with the inner wall of the ring 15 and the outer wall of the ring 21. This gasket joint, together with the screw threaded joint between the cap 19 and ring 15, give ample assurance against leakage of fuel or vapor from the tank. The efficacy of the mercury seal for preventing the leakage of vapor up around the wiping arm 48 and contact points 49 has been heretofore described. It will be observed that if the unit should be inclined or tipped over during shipment, the mercury will nevertheless be retained in the sleeve 25 and will automatically restore itself upon the righting of the device so as to maintain equal legs of mercury within the sleeve 25 and within the inverted cup 42.

I do not intend to be limited to the particular details herein shown and described except as they are defined in the appended claims.

I claim:

1. In a liquid fuel indicator for motor vehicles, the combination of a lower shell adapted for attachment to the liquid fuel tank, float mechanism pivotally supported below said shell, an upper shell cooperating with said lower shell, electrical contact mechanism disposed in an enclosure between said shells and connected to said float, and sealing means between said shells comprising a liquid seal and a compressible gasket.

2. In a device of the class described, the combination of a casing having upper and lower casing sections, said lower casing section comprising a ring portion having an upper outwardly extending flange and a lower inwardly extending flange, said ring portion being set in an opening in the fuel tank with said upper flange secured to the top of said tank, said ring portion being internally threaded for the reception of said upper casing section, a gasket seated on said inwardly extending flange, a shell extending down through said inwardly extending flange, said shell having an outwardly extending flange overlying said gasket, a disc superposed on said latter flange, an insulating spool mounted on said disc, a coil of resistance wire wound on said spool, a plurality of contact points on said spool having tapped connection with said coil, a shaft passing down through said spool and through said shell, a contact arm carried by said shaft for cooperation with said contacts, a sleeve carried by said shell and surrounding said shaft, a tubular bearing around said shaft, an inverted cup secured to said shaft and dipping into a body of mercury between said sleeve and said tubular bearing, a gear secured to the lower end of said shaft, a sector gear meshing with said latter gear, and a float for rotating said sector gear.

3. In a liquid fuel indicator adapted for attachment to a fuel tank, a casing comprising upper and lower casing sections, said lower casing section being of cup-shaped form and the body thereof being adapted to be disposed in an opening in the fuel tank, said lower casing section having an upper flange secured to the wall of said fuel tank, said upper casing section being screwed downwardly in an internal thread in said lower casing section, a compressible gasket resting on an inwardly extending flange of said lower casing section, means for imposing the pressure of the said upper casing section upon said compressible gasket when said casing sections are screwed together, a shaft entering said casing, level responsive means connected to the said shaft, and a liquid seal disposed within the said casing.

4. A unitary transportable device of the character described, capable of being connected to a liquid receptacle, comprising a fluid responsive member inserted within said receptacle, an electrical contact member above said first mentioned member, an intermediate casing between said members having a liquid seal therein, said casing being enclosed in such a manner that the sealing liquid may flow to any part of said casing during the transporting of said device and be confined thereby but is capable of sealing by automatically resuming its normal position when the device is connected to the receptacle.

5. In a unitary transportable device of the character described capable of being connected to a liquid tank, the combination of a fluid responsive member located inside the tank with an electrical contact device in proximity to said first mentioned member, an intermediate casing between the electrical contact device and the liquid responsive member having a liquid seal therein, said casing being hermetically sealed whereby the liquid may flow within said casing during the transportation of same and yet is capable of resuming its normal sealing position whenever the device is connected to the receptacle.

6. In a device of the character described, a liquid tank, a liquid responsive member located in said tank, an electric controlling device mounted on said tank comprising a movable contact member, means connecting said liquid responsive member with said movable contact member comprising a rotatable shaft, a closed member through which said shaft passes with a close fit and a seal in said chamber consisting of a liquid of a viscous nature to obviate leakage of the liquid from said chamber about said shaft but prevent the passage of vapor from said tank to said electric controlling devices.

7. In a device of the character described, a liquid tank, a liquid responsive member located in said tank, and an electric controlling device mounted on said tank comprising a movable contact member, means connecting said liquid responsive member with said movable contact member comprising a rotatable shaft, a closed chamber through which said shaft passes with a close fit, an inverted cup-shaped member secured to said shaft with a hermetical fit and located in said chamber, and a seal in said chamber consisting of a liquid of a viscous nature to obviate leakage of the liquid from said chamber at the point where said shafts pass through said chamber but prevent the passage of vapor from said tank to said electric controlling devices.

In witness whereof, I hereunto subscribe my name this 12th day of June, 1923.

BENJAMIN F. WINTERHOFF.